(12) United States Patent
Gerdes et al.

(10) Patent No.: US 7,746,773 B2
(45) Date of Patent: Jun. 29, 2010

(54) SYSTEM AND METHOD FOR DYNAMICALLY OPTIMIZED MESSAGE PROCESSING

(75) Inventors: Martin Gerdes, Monschau-Rohren (DE); Raphaël Quinet, Liège (BE); Roman Levenshteyn, Aachen (DE); Torsten Dinsing, Leichlingen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 424 days.

(21) Appl. No.: 10/596,525

(22) PCT Filed: Dec. 17, 2003

(86) PCT No.: PCT/EP03/14410

§ 371 (c)(1),
(2), (4) Date: Mar. 8, 2007

(87) PCT Pub. No.: WO2005/059746

PCT Pub. Date: Jun. 30, 2005

(65) Prior Publication Data

US 2007/0189159 A1 Aug. 16, 2007

(51) Int. Cl.
*H04L 12/24* (2006.01)
*H04L 12/58* (2006.01)
*H04J 3/14* (2006.01)
*G06F 15/177* (2006.01)

(52) U.S. Cl. ............... 370/230; 370/392; 370/465; 709/223

(58) Field of Classification Search .......... 370/230, 370/392, 437, 465; 704/208; 709/223–229
See application file for complete search history.

(56) References Cited

U.S. PATENT DOCUMENTS

| 6,775,728 | B2 * | 8/2004 | Zimmer et al. ......... 710/260 |
| 7,379,959 | B2 * | 5/2008 | Hinni et al. ............ 709/202 |
| 2007/0058668 | A1 * | 3/2007 | Culbreth et al. ........ 370/465 |
| 2007/0116053 | A1 * | 5/2007 | Pedlar et al. ........... 370/473 |
| 2008/0155024 | A1 * | 6/2008 | Morris ................... 709/206 |

FOREIGN PATENT DOCUMENTS

| WO | WO 01/46837 A | 6/2001 |
| WO | WO 0146837 | * 6/2001 |

* cited by examiner

Primary Examiner—Tri H Phan
(74) Attorney, Agent, or Firm—Michael G. Cameron

(57) ABSTRACT

The invention comprises a method and system for dynamically processing messages. After a message is received from a network or from an internal application, and the message type is identified, the invention determines whether an optimized handler should be used to process messages of the identified message type. If an optimized handler has not previously been generated for the identified message type or is otherwise not available, an optimized handler may be generated, during run-time, for subsequent processing of messages of the identified message type. In some embodiments, the invention maintains statistics relating the processing characteristics of different types of messages and these statistics are used to determine whether to generate an optimized handler or to use a generic handler to process subsequently received messages having a certain identified message type.

19 Claims, 6 Drawing Sheets

ID OF THE INVENTION

The field of the invention relates to communications. More specifically, the invention relates to a technique for dynamically optimizing message processing.

BACKGROUND OF THE INVENTION

It is becoming increasingly common for server systems to interact with each other over networks, such as the Internet and local area networks, to provide distributed and flexible computing solutions. Such server systems employ a variety of different programming languages, some having a low level message format (e.g. binary representation), while other languages use high level and more complex message formats (e.g., SOAP, XML-based message formats).

While high level languages can provide more flexible techniques for conveying message content and structure, such formats tend to necessitate lengthy and complex messages (this is especially the case for XML-based standards). As the message length and complexity increases, so does the required processing time needed to handle such messages (which includes, inter alia, the time needed to convert the message into a format suitable for use by the intended application). Accordingly, complex and lengthy message formats increase the constraints (e.g., costs, bandwidth and traffic requirements, etc.) associated with wide-scale deployments of architectures based on such formats. These constraints are particularly problematic in large Internet-based deployments where millions of messages need to be processed within short periods of time.

Currently, there are some software packages that may be used for message handling that can optimally process a limited number of special message types, provided however, that these special cases are identified in advance of the processing. Most message handling programs typically include a set of functions within a library that converts the incoming messages from the message format into the internal representations which are used by an application. These libraries contain handlers that are optimized to perform the analysis of certain types of messages and build the internal representation in a format useful for the application. With such conventional message handling techniques, the libraries are prepared in advance so that they typically cover only a limited number of special cases with regard to different message formats. However, when a message is received for which there is no corresponding optimized handler (such as the case with an application server that acts as a generic platform for different types of application having a shared common functionality), a generic handler is utilized that is typically not as efficient as an optimized handler. As a result, such systems utilize a set of optimized handlers that are estimated to correspond with certain types of expected message traffic, and these estimations do not always accurately reflect the types of messages most often received. Accordingly, conventional techniques are unable to maximize the number of messages that are processed with optimized handlers rather than generic handlers resulting in inefficient processing.

With XML Web Services protocols, generic handlers, or parsers, can be used to process any kind of XML document and also typically obtain and interpret the XML Schema of a message during run-time. More specifically, there are two main types of generic parsers that are often incorporated into libraries. Event-driven generic handlers (for example based on Simple API for XML "SAX" handlers used to configure Java beans) process the document, and call some functions in the application every time they encounter a new element, a new attribute or another identifying feature within a message. The application is responsible for interpreting each event and deciding how to process it. With this arrangement, most of the processing and analysis of incoming messages is handled by the application because the generic handler is doing little more than a lexical analysis. In order for this situation to be efficient, knowledge about the message format must be incorporated into the design of the underlying application. This requirement greatly reduces the flexibility of the type of messages to be received by the underlying application and results in additional programming costs.

Other generic handlers used in connection with XML documents build an internal representation of the XML document using a tree structure such as a Document Object Model (DOM). This internal representation can then be accessed by the application receiving the message content which uses queries to search for specific elements or traverse the tree by getting the list of children for each node in the tree.

In this case, the application does not need to be compiled to reflect the full document structure, but rather, it only accesses those elements of interest.

In addition to generic handlers, a typical library for XML documents will also incorporate specific parsers that are designed for specific XML Schema and are typically generated at or around the compile time for the underlying application (which are presumably optimized for the type of messages expected to be received). These handlers can only parse and validate those documents that incorporate a specific XML Schema. Similar to generic handlers, an optimized handler may or may not build an internal representation like a DOM tree (which is often hidden from the application programmer because the application is expected to use some schema-specific functions generated together with the parser for accessing parts of the data). An approach that utilizes a DOM tree is useful in accelerating the processing of certain type of documents as the application only has to query the DOM tree for parts of the documents of interest. While this simplifies the work for the application programmer, it is relatively inefficient, as XML Schema must be interpreted at run-time. This is especially time consuming if the handler must validate an XML data DOM tree. In addition, allocation of internal representations provided in such a DOM tree is not necessarily efficient because most handlers allocate the children of each node dynamically as a regular document.

It can be appreciated that a more efficient usage of XML Schema could allocate the internal data structures more efficiently, based on constraints specifying the number and type of children of each node. In addition, if the internal representation is not optimal then it is likely that the functions querying the tree are not necessarily optimal. Such inefficiencies can be avoided or reduced by generating a new optimized handler at run-time for the specific schema used by the documents, however, conventional technologies do not provide such on-the-fly generation of optimized handlers. The constraints imposed by the Schema on the document can be then compiled directly into the code of the specific parser instead of having to be interpreted every time. In addition the internal representation can be optimized according to the expected structure of the document as defined by the Schema.

Based on the foregoing, it can be appreciated that there remains a need for an arrangement where message processing handlers are optimized for the current type of traffic within a dynamically changing message flow.

SUMMARY OF THE INVENTION

The current invention provides, in one embodiment, a method for optimizing message processing comprising the steps of receiving a message, identifying the message type of the received message, determining whether an optimized handler should be used to process messages of the identified message type, generating, during run-time, an optimized handler for the identified message type if it is determined that an optimized handler should be used, and an optimized handler is not available for the identified message type, and processing messages of the identified message type with the optimized handler associated therewith if it has been determined that an optimized handler should be utilized.

The current invention is also embodied in a method for optimizing message processing. The method commences with the receipt of a message (e.g., via a network or an internal application). The received message is then analyzed to identify its message type (by analyzing indicators such as identifiers within the message such as headers and namespaces, or by analyzing other criteria such as the semantics of the data contained within the message). Once the message type has been established, the method determines whether an optimized handler should be used to process messages of the identified message type. The optimized handler may be selected from one of a preexisting set of optimized handlers for the identified message type, or if a suitable optimized handler has not previously been generated (or is not otherwise available) for the identified message type, then an optimized handler is generated during run-time for the identified message type (using e.g., methods similar to Apache AXIS or Castor XML depending on the message format). The method concludes with the processing of messages of the identified message type with an optimized handler associated therewith. This processing may comprise parsing the message or otherwise converting or validating it to a format or internal representation that may be used by an application intended to receive the messages.

In some variations of the method, characteristics (e.g. statistics) for each message type are recorded. This recorded information may be utilized to determine whether an optimized handler should be generated and/or used to process messages of the identified message type. This determination may be based on occurrence statistics of different message types or on a comparison between processing statistics for the identified message type using an optimized handler versus a generic handler. As there may not be processing statistics data for either or both of the optimized handler or the generic handler, the processing statistics may be estimated based on expected processing statistics (although preferably they are based on actual measured processing statistics).

The characteristics including the occurrence statistics, the processing statistics or other statistics may be based on a variety of performance and use related metrics or other user-defined criteria. For example, an optimized handler may be selected for processing a certain message type if the comparison step determines that the generic handler requires fifty percent more time than the optimized handler for processing certain message types. The determination of whether to use an optimized handler (and to generate one if one has not already been generated) for a particular message type could be based on statistics related to how often a message type is processed or the time interval since the last message of the same type was processed.

The method may also include the step of determining whether a generic handler should be used to process messages of the identified message type. In some cases, the method may determine that a generic handler is more appropriate for processing a certain message type (at a certain time), so messages of such type are processed with a generic handler.

Although the generation of an optimized handler/parser consumes time in some resources, it generally has a minor effect on processing times. To verify that the optimized handlers are performing better than a generic handler the system can simply gather statistics about the parsing/processing times for a given type of documents. If statistics show that the optimized parser/handler for a given type of data performs worse than a generic parser or handler the optimized parser can simply be abandoned and a generic parser will be used for this type of message. This check ensures that the system will, at a minimum, perform at least as effectively as a generic parser or handler.

If computer resources were not a limiting factor, the optimal case would be to generate a special message handler for each type of message that may be received. However, with most computer systems, resources remain a limiting factor and so the current invention, in some embodiments, generates optimized handlers only for those cases that are designated as higher priority or otherwise frequently used types of messages. This priority designation may be based on a number of user criteria such as most recently used, least recently used, etc.

In one specific embodiment, the method may further include the step of determining whether a similar message type has already been processed, and based on this determination, the method further determines whether an optimized handler exists for the identified message type. If an optimized handler does not exist, then the method may determine whether to generate an optimized handler for the identified message type. However, if a similar message has not previously been processed by the method, and thus there are no actual measurements regarding the characteristics for the identified message type (and the method has not estimated the processing statistics), then a generic handler may be selected to process messages of the identified message type (and the characteristics data for the identified message type being processed by a generic handler will be recorded in the statistics database or library for use in subsequent decisions regarding the handler type used to process future messages of the same type). Otherwise, an optimized handler may be selected to process messages of the identified message type.

If it has been determined to generate an optimized handler during run-time, the method may also make a determination whether there is sufficient storage space or processing capabilities to generate a new optimized handler. If there is not sufficient space, one or more optimized handlers may be deleted, provided that their deletion results in adequate space or processing capabilities. The decision of which handler to delete can be based on a variety of criteria, such as overall usage statistics for particular handlers, last used handler, etc. (and in some arrangements, the handlers are prioritized according to these or other criteria so that only handlers with low priority are deleted).

The method may also incorporate the step of associating certain message types with specific types of optimized handlers. This association may result from populating a library or database associating the message types with the specific handlers. The database may be updated over predetermined intervals such as after every message or every ten minutes so that the step that determines whether to use an optimized handler or a generic handler is provided with current processing characteristics data for each type of handler for each type of message.

In some embodiments, the method may also include the steps of monitoring the usage of the messages by the application receiving the messages, and selectively processing portions of the messages based on the monitored usage by the application. With this arrangement, only those portions identified as being used above a certain threshold (and are thus prioritized) are selected for processing. This selective processing technique is particularly useful for handling large messages where only portions are utilized by the application. Alternatively, different criteria may be utilized to determine what portions of the message to process based on other user criteria such as message length, etc. If a portion of a received message is not selected for processing, the processing of such a portion is delayed until the application subsequently requires the portion of the message (which may not necessarily occur). The monitoring and selective processing steps may also be used in a method independent of the selection of an optimized or generic handler as it can be appreciated that selective processing may greatly increase the efficiency of message processing regardless of the type of message handler used.

The current invention may also be embodied in a system that is configured to perform some, if not all of the steps of the methods described above. One system embodiment for optimizing message processing includes a message receipt module for receiving a message, and a message type identification module for identifying the message type of the received message. A handler selection module determines whether an optimized handler should be used to process messages of the identified message type. Once it is determined that an optimized handler should be utilized, an optimized handler generator module generates, during run-time, an optimized handler for the identified message type if an appropriate optimized handler has not already been generated. The system also includes a first processor module for processing messages of the identified message type with the optimized handler associated with the message type (whether generated during run-time or generated previously) if it has been determined that an optimized handler should be utilized.

System embodiments of the current invention may also provide that the handler selection module is configured to determine that a generic handler should process messages of the identified message type if an optimized handler is not utilized. In such arrangements, the system would also include a second processor module for processing messages of the identified message type with a generic handler if it has been determined that a generic handler should be utilized.

Yet other variations of the system include a recording module that records characteristics (such as processing and usage characteristics, etc.) for each message type. The characteristics can be used in connection with a comparison module that compares actual or estimated processing statistics for similar messages handled with a generic handler to actual or estimated processing statistics for same type messages handled with an optimized handler. This comparison may later be used by the handler selection module to determine whether to use a generic or an optimized handler.

The system may also provide for selectively processing messages based on the usage or other statistics relating to how the messages interact with the receiving application. Such a system could be used in connection with the other variations of the current invention, or separately as a filter to selectively determine which portions of messages to process. The system would include a monitoring unit for monitoring the usage of the messages by the application receiving the messages, and a processing selection module for selectively processing portions of the messages based on the monitored usage by the application (or estimated or expected usage requirements of the application). The processing module may be configured to delay the processing of certain messages for pre-defined periods of time or when there is a requirement for those portions of messages that had previously not been processed. It can also be appreciated that the monitoring module and the selective processing module may provide enhanced processing characteristics regardless of whether handlers are generated during run-time or are generated at the time of application compilation.

The current invention may also be embodied in a computer program product which may be stored on a computer usable recorded medium having computer readable code embodied therein for optimizing message processing. The computer code product including computer readable program code portions for receiving a message from a network or from an internal application, computer readable program code portions for identifying the message type of the received message, computer readable program code portions for determining whether an optimized handler should be used to process messages of the identified message type, computer readable program code portions for generating, during run-time, an optimized handler for messages of the identified message type if it is determined that an optimized handler should be used to process messages of the identified message type, and an optimized handler had not previously been generated for messages of the identified message type, and computer readable program code portions for processing messages of the identified message type with the optimized handler associated therewith if it has been determined that an optimized handler should be utilized.

Another variation of the current invention provides for a system comprising a computer processor and a memory coupled to the processor, where the memory is encoded with one or more programs that may perform a method for optimizing message processing. The method may include all or selective portions of the invention as described herein.

The current invention may be utilized with a variety of message formats. The messages may contain some unique identifier within its body, for example, the schema or namespace declaration for an XML document. In other cases, there may be information contained within a format of a message which identifies the type of underlining message. For example, with HTTP messages, the header of a message is could identify the type of message. In addition, if a message starts with POST request, then such a message is identified as having encoding belonging to a POST request. The invention may also determine what type of format is within a message based on a resource consumption statistic. However, in some arrangements more system resources may be consumed for identifying the format as a message then what is gained by the optimized handling.

BRIEF DESCRIPTION OF THE DRAWINGS

In the following the invention will be described with reference to exemplary embodiments illustrated in the figures, in which.

DETAILED DESCRIPTION OF PREFERRED EMBODIMENTS

In the following description, for purposes of explanation and not limitation, specific details are set forth, such as particular sequences of steps and various configurations, etc. in order to provide a thorough understanding of the present invention. It will be apparent to one skilled in the art that the present invention may be practiced in other embodiments that depart from these specific details including a wide array of messaging technologies. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, where the memory is encoded with one or more programs that may perform the methods disclosed herein.

As will be described in greater detail below, the current invention may be most useful in connection with the handling (processing, parsing, validating, converting, etc.) of complex message formats such as SOAP or other XML-based formats, whether by a platform or application server or otherwise, as well as other formats where the type of document or at least a portion of the document can be easily identified. The current invention also provides significant benefits in connection with message processing or handling systems that use a generic handler or processor that is separate from the application using the message content and which acquires knowledge about the format, type, and structure of the messages during run-time.

Figure 1:
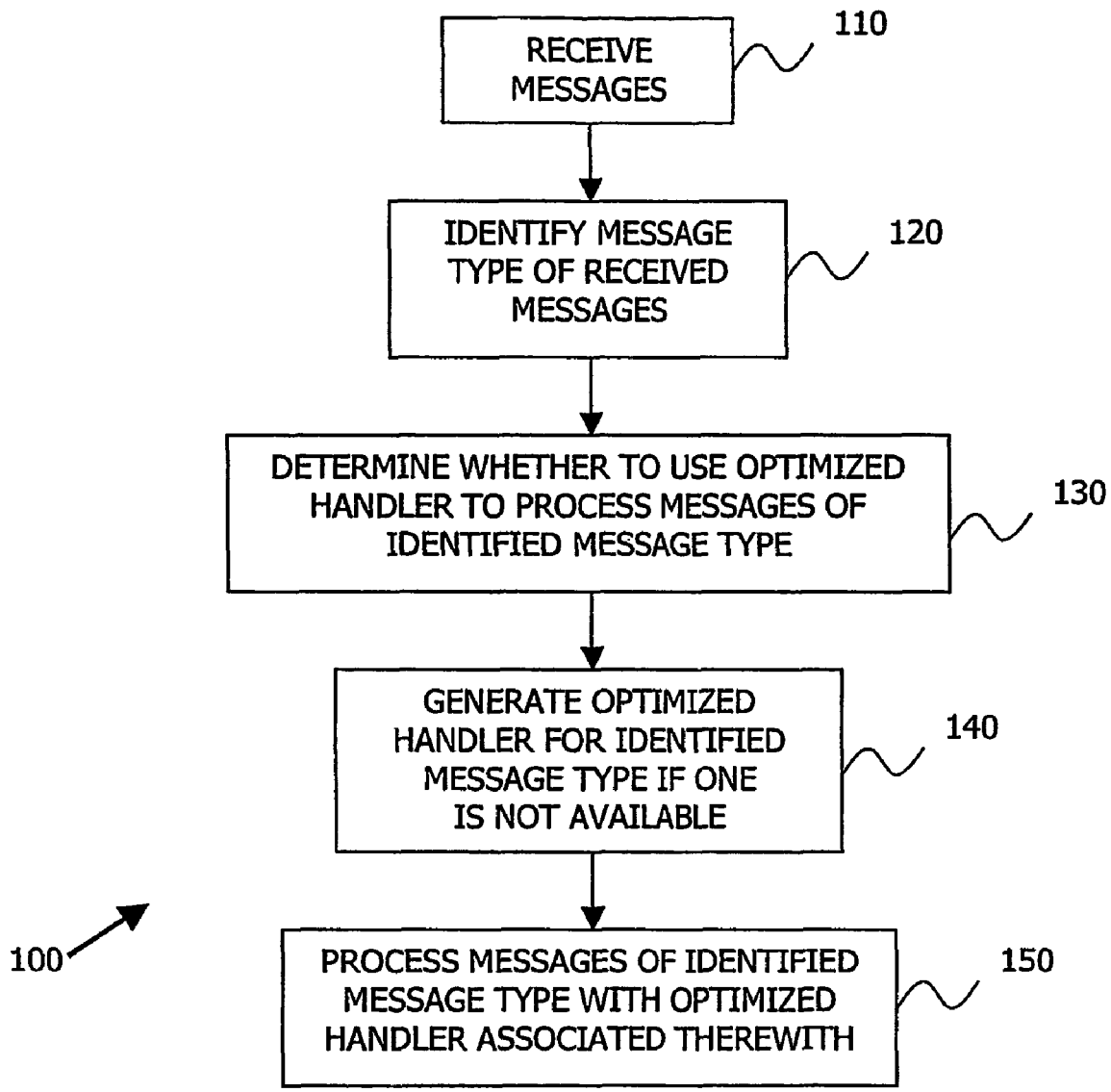
FIG. 1 is a process flow diagram according to a first embodiment of the invention.

With reference to FIG. 1 a method is illustrated 100 that commences, at step 110, with the receipt of a message by a message processing unit from an application coupled to the message processing unit via a network or internally. The received message may then be examined, at step 120, to determine its message type through indicators within the message such as XML Schema (so that later determinations may be based on this message type). Preferably, the message type identification is rapidly and efficiently accomplished using techniques known in the art. Based on the message type, at step 130, the method then determines whether it is appropriate to use an optimized handler to process the message. This could be base on factors such as expected processing time if an optimized handler is used versus a non-optimized handler. If an optimized handler does not exist for the message type, step 140 provides for the generation of an optimized handler during run-time (i.e., as messages are being received). The method concludes, at step 150, with the processing of the message using an optimized handler associated with the document type (this may either be the newly generated optimized handler or a previously generated optimized handler accessible via a library or database). The processing step may include the parsing and validation of a message or other actions so that the message is in a format accessible and understandable by the receiving application.

The optimized handler may be generated 140 during run-time using commonly available packages such as the open source Apache AXIS or a database binding framework such as Castor XML. For example, the optimized handlers may be implemented in computer languages such as Java, C#, C, C++. Other programs or routines may be utilized depending on the application implementation, the types of messages being processed, etc.

Figure 2:
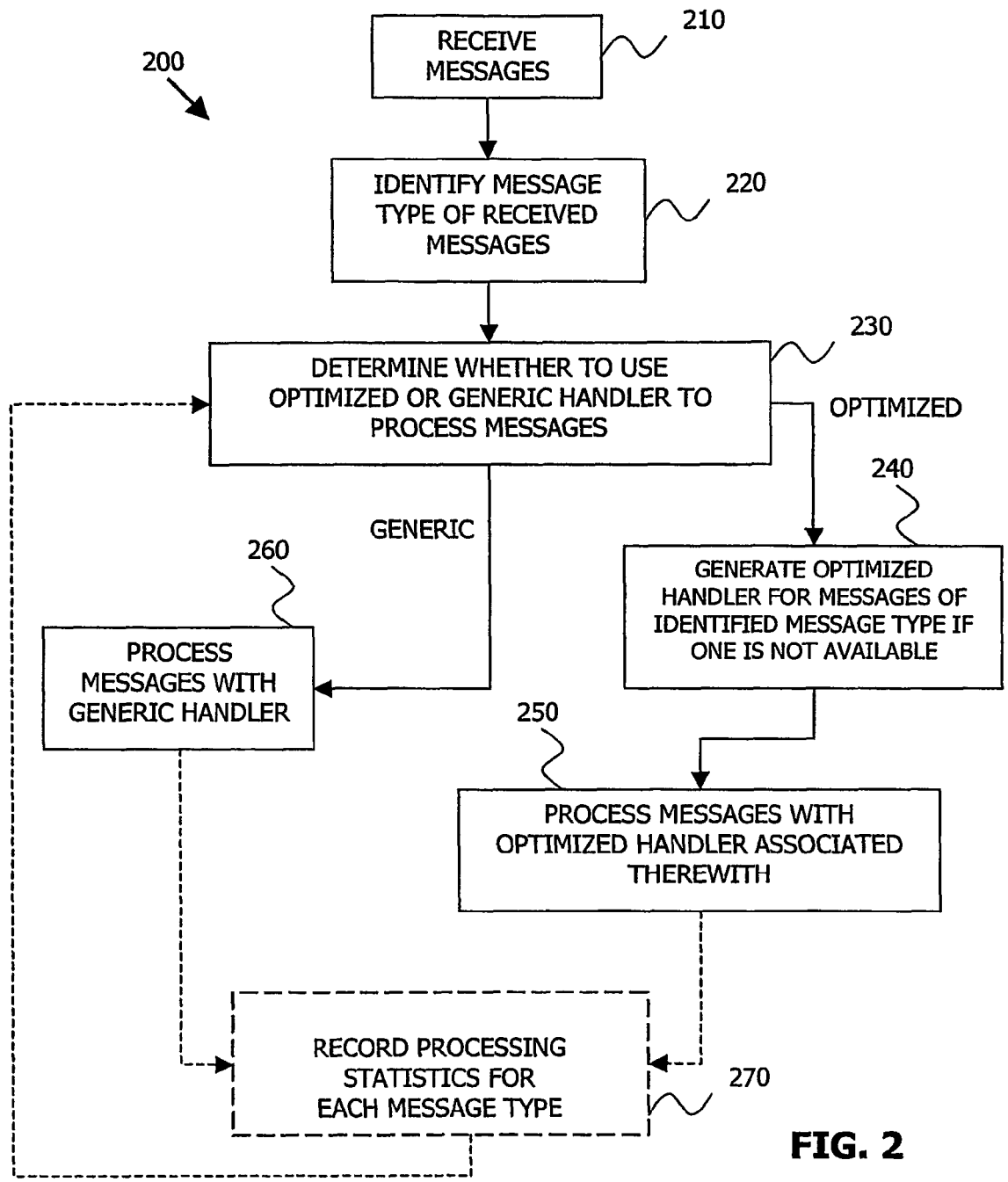
FIG. 2 is a process flow diagram according to a second embodiment of the invention.

FIG. 2 illustrates a method 200 that similar to the method of FIG. 1, commences, at step 210, with the receipt of a message 210 by a message processing unit, and a determination, at step 220, of the type of message received. At step 230, the method departs from the previous method in that it determines whether to use an optimized handler or a generic handler to process the received message. This determination may be based on a variety of factors including processing characteristics for similar message types (as described below) or it may be the result of an intelligent prediction agent (e.g., a neural network, etc.). If an optimized handler is selected, at step 240, an optimized handler is generated if one does not already exist for that message type, and at step 250, the message is processed using the optimized handler. In contrast, if the method, at step 230, determines that a generic handler is to be utilized, the message is processed with one or more generic handlers at step 260 (which typically results in a less efficient processing for a particular message type).

Optionally, the embodiment of FIG. 2 may also include the step of recording processing characteristics for each message type at step 270 (in a library or other database). This processing characteristics information is collected for both generic and optimized handlers for all message types and can provide a useful source of quantitative data regarding the performance and other characteristics of various message types processed according to the current invention. This relationship is illustrated in FIG. 2 in a dotted line as it is not essential to the current invention, but rather, provides a data source useful in making the determination, at step 230, of which type of handler to use to process a certain message type.

The library collects information about the messages that have already been processed based on their type or format. This data can include the number of messages of a certain type that have been processed thus far or during a pre-defined time interval or other statistics such as overall percentages of handled message types. Based on message types previously processed and other related processing statistics, the invention generates special optimized message handlers.

Furthermore, the input and output parameters of these optimized message handlers are compatible with those of generic handlers so that an optimized handler can be used in place of the generic handler at any time without the requirement to change the application or library. Some embodiments also provide that if during processing of a message having a certain message type by an optimized handler, an unsupported format occurs or if other data suggests that the generic handler is more efficient, the handling of current and subsequent messages of that type may be processed using a generic handler.

Unlike other systems such as Java Virtual Machines (JVMs) with just-in-time compilers (JIT) or other interpretation engines capable of executing a program written in the corresponding language, the statistics database or library utilizes the high level semantics of the program for optimization purposes. Accordingly, the statistics database while utilizing conventional information such as frequency of the execution of the coded fragment, resource consumption by a given fragment, etc., it also utilizes information regarding the required functionality for processing the message type. In addition, the current invention using the input formats and the message composition formats allow the messages to be processed according to their descriptions. As the current invention correlates the statistic databases with high level semantics of the parser/handler and about the data being processed, it is much more efficient than the conventional techniques. In other words, the current invention is a technique for data driven run-time optimization based on a more intelligent optimizers which is integrally based on the semantics of operations and data received by the application.

Figure 3:
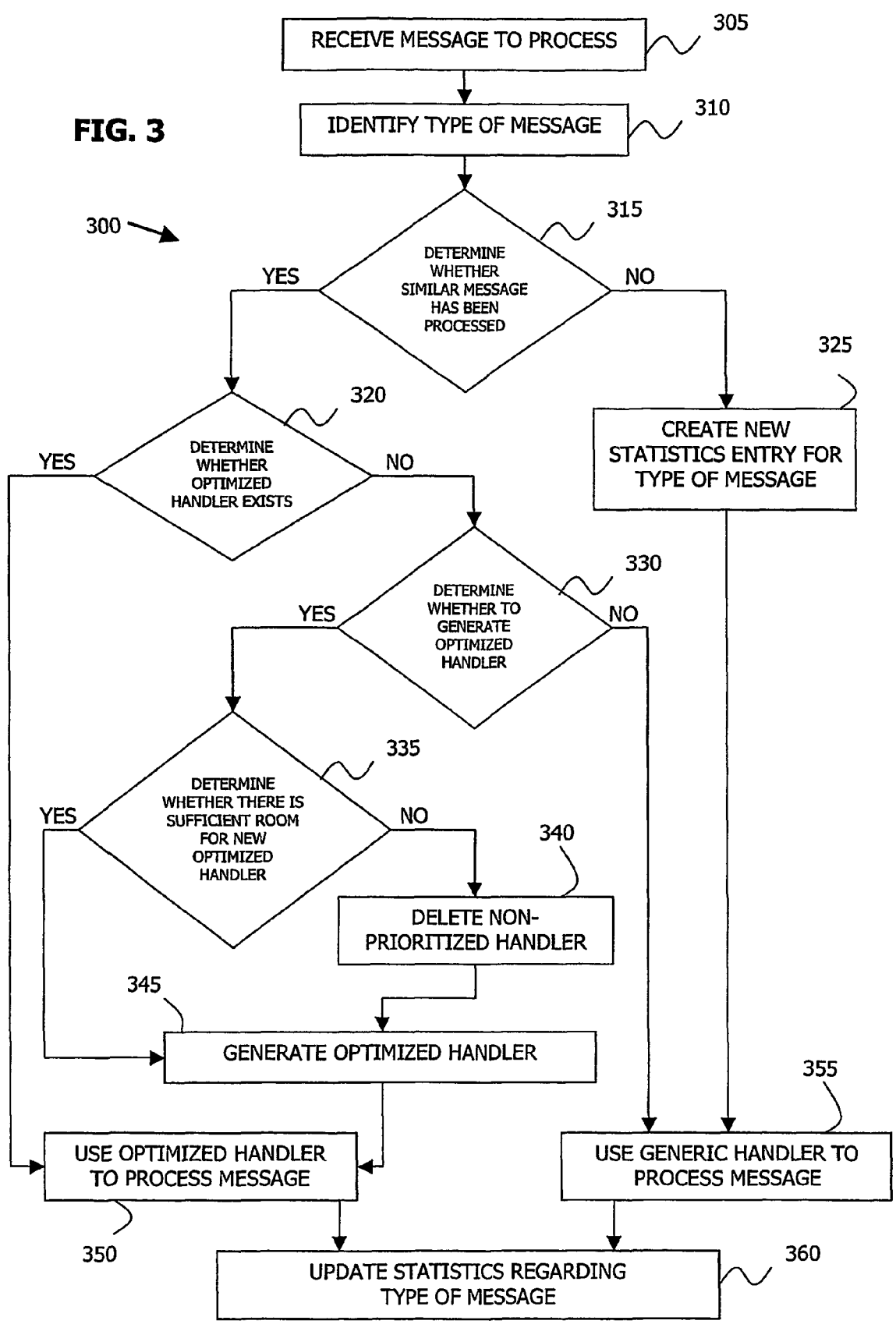
FIG. 3 is a process flow diagram according to a third embodiment of the invention.

Yet another embodiment of the current invention is illustrated in FIG. 3 as a method for processing messages 300. The method begins, at step, 310, with the receipt of a message for processing 305 by a message processing unit. At step 315, the method determines whether a similar message has been processed by accessing an external database or library that maintains statistics about the processing characteristics of the underlying system implementing the method. If a similar message type has been processed, at step 320, it is then determined whether an optimized handler exists. Conversely, if a similar message type has not previously been processed, then a new entry is generated, at step 325, for the type of message. This entry will later be used to generate and record processing characteristics regarding these types of messages after the message has been processed, at step 355, using a generic handler, and the processing statistics regarding the processing of the message using the generic handler are updated at step 360.

Returning to step 320, if it is determined to use an optimized handler, then the message is processed using an optimized handler at step 350. Similar to with a message processed with a generic handler, the statistics regarding the processing of the message are updated at 360. If, at step 320, it is determined that an optimized handler does not exist, then it is further determined, at step 330, whether to generate an optimized handler. If an optimized handler is not generated, then the message is processed with a generic handler at step 355. However, If an optimized handler is generated, then it must yet further be determined, at step 335, whether there is sufficient storage space to generate a new optimized handler. If there is sufficient storage space, then an optimized handler is immediately generated, at step 345, otherwise an optimized handler is selected and deleted (which can be selected by criteria such as least frequently used, last used, etc.) and then the optimized handler is generated.

Once it has been determined that a message should be processed with an optimized handler, and a handler currently exists (whether previously generated or generated during run-time as in step 345), the optimized handler processes the message at step 350, which is followed by step 360 which comprises the updating of statistics regarding the processing of the message type.

Figure 4:
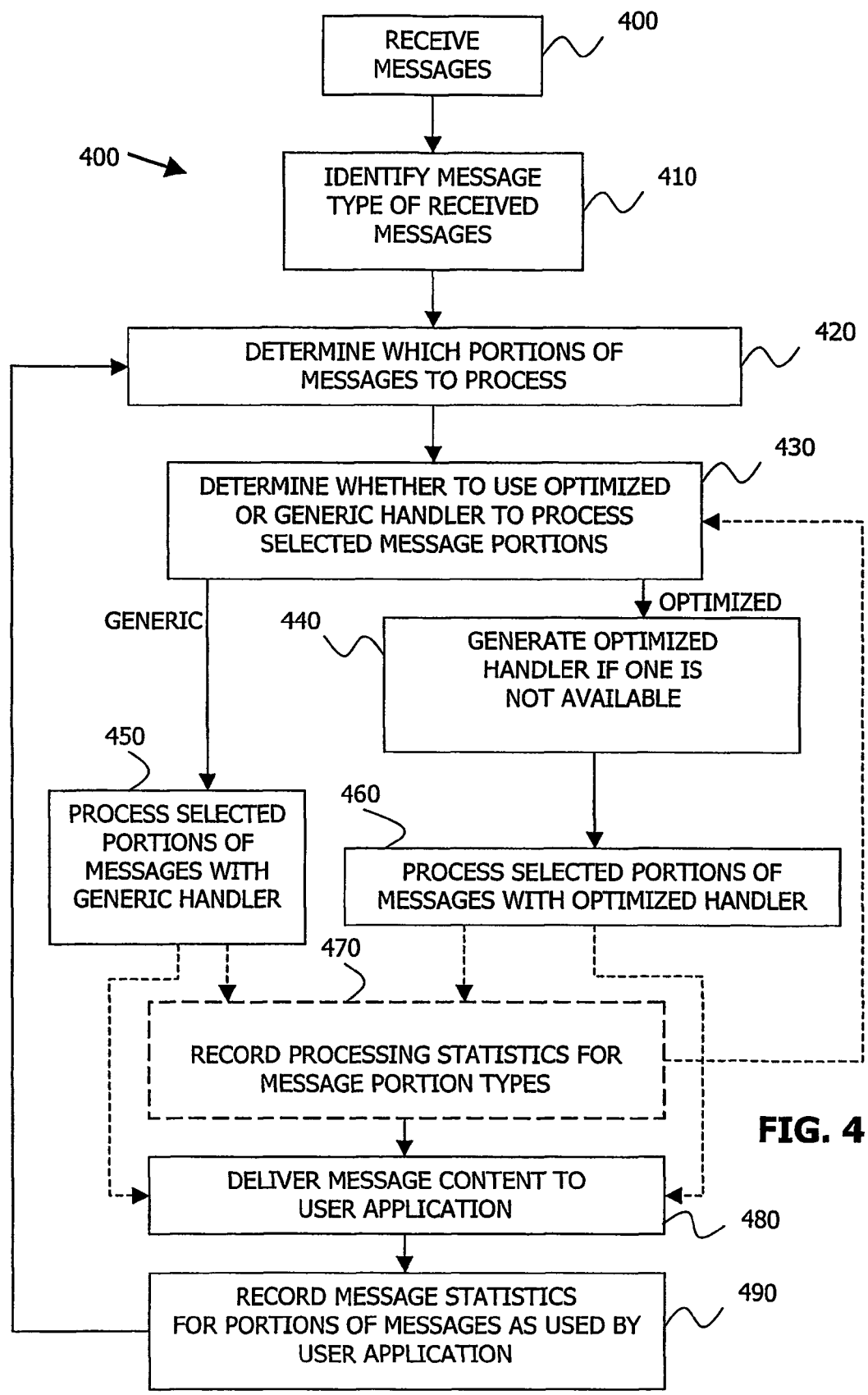
FIG. 4 is a process flow diagram according to a fourth embodiment of the invention.

FIG. 4 illustrates another embodiment of a method 400 where statistics regarding the usage of data contained within the messages by the application using the message data are monitored to determine which portions of messages need to be processed and which portions of messages need not be processed (at that time). The method commences at step 400, where a message processing unit receives a message for processing. Next, at step 410, the type of message is determined, so that at step 420, it can be determined which portions of the message are to be processed, and which portions of the message are to be delayed or otherwise deferred until some later time to be processed (if at all) based on estimated usage requirements of the application. As explained below in further detail, the estimated usage requirements are based on the monitored usage of the data within the messages by the receiving application (that receives messages from the message processing unit). In other words, if the monitored usage of the data reflects that only certain portions of messages having similar content have previously been used, then only similar portions will be processed (and the remaining portions are delayed or deferred until they are subsequently needed by the application, if ever). However, if a message having similar portions has not previously been processed, then the determination may be based on an estimation of what portions of the message will subsequently be used by the application. As can be appreciated, the method determines which portions of the message to process based on estimated usage requirements, whether they are based on prior usage history or other criteria (that do not necessarily relate to application usage).

Similar to previous methods, after it is determined which portions of the message to process, at step 430, it must then be determined what type of handler to utilize, namely an optimized handler or a generic handler. This determination can be based on message type alone or it can be based on the selected portions of the message for processing or a combination of both factors. At step 440, if an optimized handler has been selected, an optimized handler is generated to process the selected portions of the message if one does not already exist, and then the selected portions of the message are processed, at step 460, with an optimized handler. Otherwise, at step 450, a generic handler processes the selected portions of the message.

The next step may either be step 470 where the processing statistics for the type of message (and/or the type of message portions) are recorded for subsequent use at step 430 when it is determined what type of handler to utilize, or the next step may be step 480 where the message content is delivered to the application. Subsequently, the statistics regarding the usage of the portions of the messages are recorded so that such information may subsequently be used at step 420 to determine which portions of the messages are given priority (based on metrics such as most commonly used, greatest importance to application functionality, etc.).

The monitoring of the parts of documents that are most often used (or accessed) by the application receiving the processed message conversely identifies those portions of the messages which are rarely utilized, if at all. If a DOM tree structure is being utilized, the monitoring can be accomplished by intercepting the DOM and access to its application programmer interface. This embodiment is particularly useful when an application receives large and/or complex documents, of which only a portion are accessed or used by the program. For example, an application may request a profile using a User Agent Profile (UAProf) but only requires a small portion of such profile such as screen size, etc.

Figure 5:
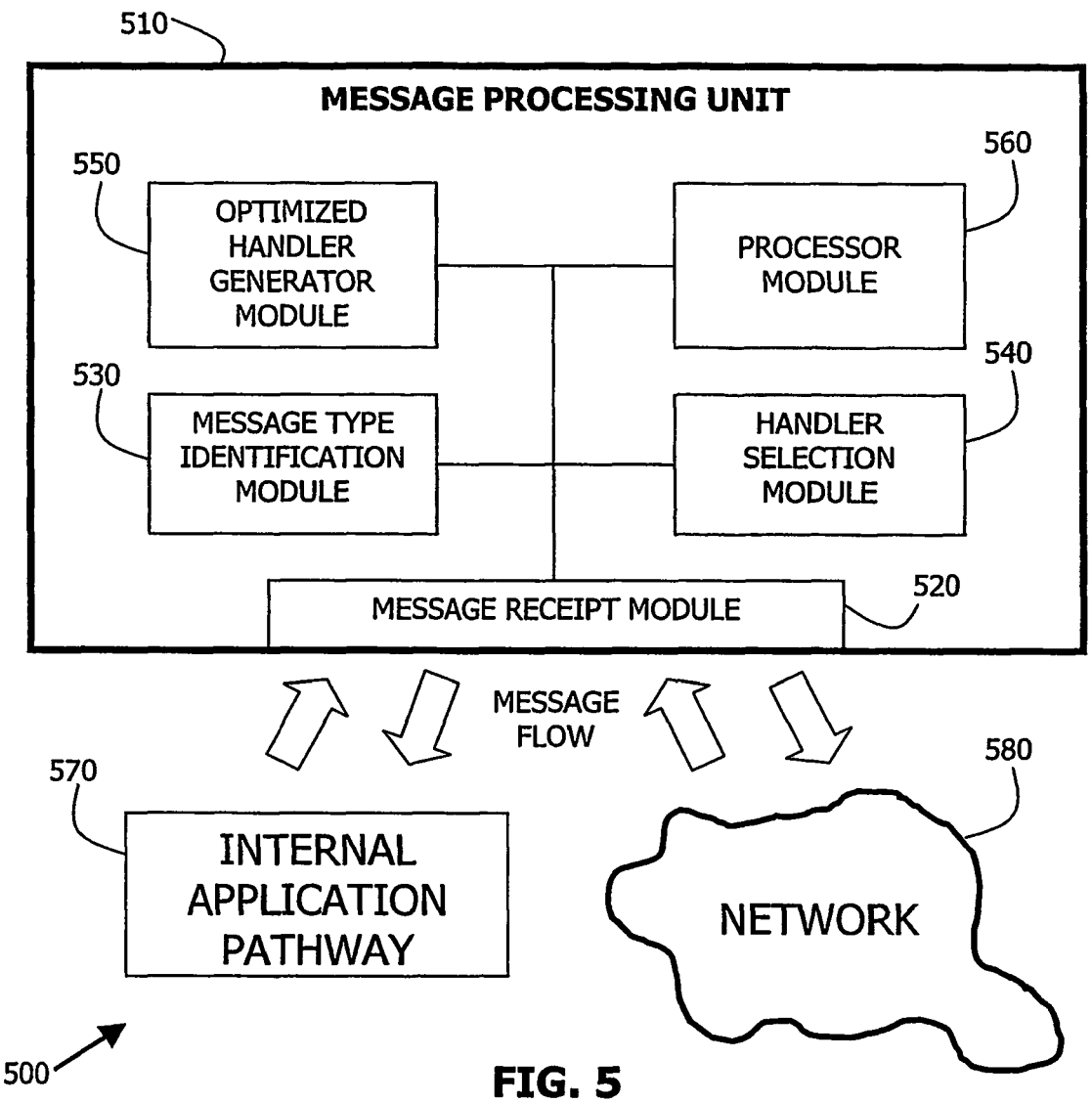
FIG. 5 is a schematic illustrating a fifth embodiment of the invention.

With reference to FIG. 5, a system embodiment of the current invention 500 is illustrated. The system comprises a message processing unit 510 which includes a message receipt module 520, a message type identification module 530, a handler selection module 540, an optimized handler generation module 550, and a processor module. The individual modules within the message processing unit 510 may be commonly connected for communications purposes as shown, or they may be individually coupled to those modules that they either receive or deliver data to (e.g., the message receipt module 520 and the message type identification module 530). The message processing unit may receive (and exchange) processed messages via (i) an Internal application pathway 570 from applications that may be internal to the system housing the message processing unit 510, and (ii) a computer network such as a LAN or the Internet.

In operation, a message is received by the message receipt module 520 of the message processing unit 510 originating either from the internal application pathway 570 or the network 580. The message receipt module 520 provides the message to the message type identification module 530 which then analyzes the message to determine the message type. The message type identification module 530 then conveys the message type to the handler selection module 540 so it can be determined whether an optimized handler will be utilized to process the message. If it is determined that an optimized handler should be used, the handler selection module 550 notifies or otherwise activates the optimized handler generator module 550 to generate an optimized handler for the message type (which may be received from either the message type identification module 530 or the handler selection module 540), if an optimized handler has not already been generated for the message type. Finally, the processor module 560 obtains the message to be processed and processes it using an optimized handler (obtained from the optimized handler generator module 550). As can be recognized by the skilled artisan, the individual modules may be combined or used in connection with other modules or sub-systems to process messages according to any one of the methods described herein.

Figure 6:
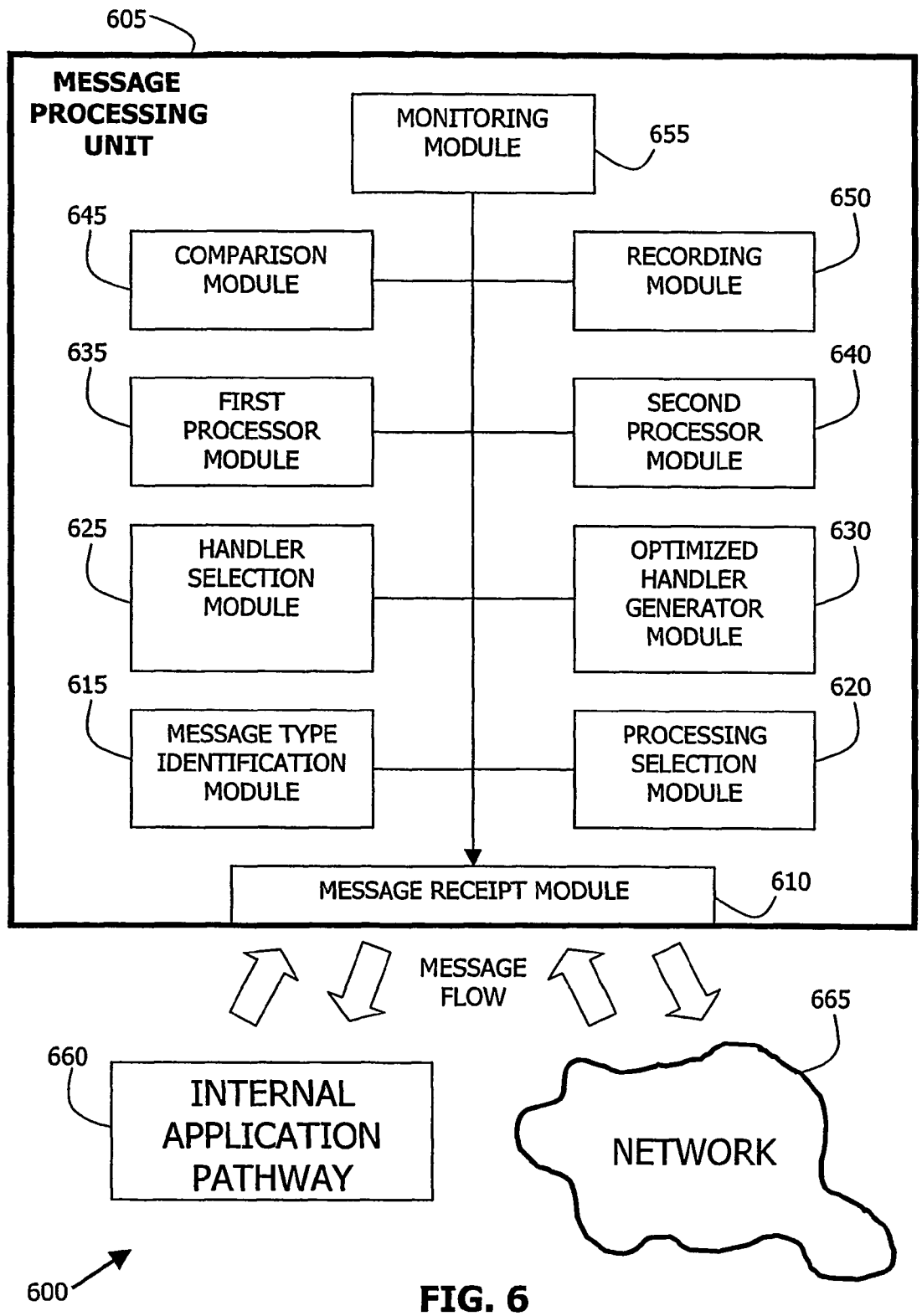
FIG. 6 is a schematic illustrating a sixth embodiment of the invention.

FIG. 6 illustrates another system embodiment of the current invention 600. The system comprises a message processing unit 605 which includes a message receipt module 610, a message type identification module 615, a processing selection module 620, a handler selection module 625, an optimized handler generation module 630, a first processor module 635, a second processor module 640, a comparison module 645, a recording module 650, and a monitoring module 655. The individual modules within the message processing unit 605 may be commonly connected for communications purposes as shown, or they may be individually coupled to those modules that they either receive or deliver data to (e.g., the handler selection module 625 and the optimized handler generation module 630). The message processing unit may receive (and exchange) processed messages via (i) an internal application pathway 660 from applications that may be internal to the system housing the message processing unit 665, and (ii) a computer network such as a LAN or the Internet.

In operation, a message is received by the message receipt module 610 of the message processing unit 605 originating either from the internal application pathway 660 or the network 665. The message receipt module 610 provides the message to the message type identification module 615 which then analyzes the message to determine the message type. The message type identification module 615 then conveys the message type to processing selection module 620 which determines whether any portions of the message should not be processed, and if so, identifies such portions. Optionally, the processing selection module 620 may be directly coupled to the message receipt module 610 if message type is not required for the handler selection module 625. The processing selection module 620 identifies the portions of the message which are to be processed by the handler selection module 625.

The handler selection module 625 determines (based on the message type, the selected portions of the message for processing, or a combination of both), which type of handler (i.e., generic or optimized) to use to process the data. If an optimized handler is to be utilized, then the optimized handler generator module 630 generates an optimized handler based on the message type, the selected portions of the message, or a combination of both, provided that an appropriate optimized handler had not previously been generated. The message or portions thereof are processed by the first processor module 635 if an optimized handler is used, otherwise the second processor module 640 is used to process the message or portions thereof with a generic handler.

The recording module 650 optionally records statistics relating to the processing characteristics of the message types or portions thereof. The comparison module 645 compares and analyzes the recorded statistics from the recording module 650 between messages of a certain type and portions thereof that are processed using a generic handler versus those processed using an optimized handler. If certain processing characteristics data is not available using a certain type of handler, the comparison module 645 may used estimated or expected processing characteristics to compare with actual processing characteristics. In addition, the monitoring module 655 may be coupled to the application receiving the processed messages from the message processing unit 605 to monitor what portions of messages (or the data contained therein) are used by such application and determine which portions of future messages are most likely to be utilized by the application. The monitoring module can later couple to the processing selection module 620 to determine which portions of subsequent message types are to be processed using the system (and conversely, which portions of messages are to be processed at a later, yet to be defined, time).

The current invention provides significant flexibility and related benefits to application programmers. One of the main improvements is the provision of a technique for message handling where the type of message types (data structures) are not known in advance. Implemented in connection with XML, the current invention obtains information about the format structure of the data (message type) only at run-time because XML defines not only the contents of the input data but also the structure of the data using a XML Schema language or the like. This arrangement makes it impossible to have predefined set of processing algorithms which match the message types in the most efficient manner, and therefore, efficient processing of message types may only be accomplished through the current invention.

Increased performance as provided by the current invention can result in wider adoption of formats such as XML (and for example in connection with mobile communication devices). The skilled artisan will also appreciate that the current invention may be useful for Implementation of application servers that handle multiple types of applications. This functionality may include parsing of incoming messages. By using the current invention it is possible to achieve improvements such as increased performance of applications, obviation of the requirement to modify the applications, obviation of the requirement for the programmer's intervention or participation into the optimization process for message handling, and increased flexibility allowing optimization techniques to be changed updated or removed on the application server without any impact on the functionality of the underlined applications.

While the present invention has been described with respect to particular embodiments, those skilled in the art will recognize that the present invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A method for optimizing message processing comprising the steps of:
   collecting processing characteristic information for various message types;

recording processing characteristic information for each such various message type collected;

generating from the recorded processing characteristic information, quantitative data regarding the performance and other characteristics of each such various message type;

receiving a message;

identifying the message type of the received message;

determining whether an optimized handler should be used to process messages of the identified message type based on the quantitative data regarding the performance and other characteristics of each such various message type;

generating an optimized handler for the identified message type if it is determined that an optimized handler should be used, and an optimized handler is not available for the identified message type; and processing messages of the identified message type with the optimized handler associated therewith, if it has been determined that an optimized handler should be utilized.

2. The method of claim 1, wherein the statistics include occurrence statistics for different message types.

3. The method of claim 1, wherein the statistics are based on performance related metrics, use related metrics or user-defined criteria.

4. The method of claim 3, further comprising the step of generating and/or comparing processing statistics for the identified message type.

5. The method of claim 4, wherein the processing statistics of the identified message type processed using a generic handler are actual or estimated processing statistics; and/or wherein the processing statistics of the identified message type processed using an optimized handler are actual or estimated processing characteristics.

6. The method of claim 1, further comprising the steps of:

determining whether a generic handler should be used to process messages of the identified message type; and processing the message with a generic handler if it has been determined that a generic handler should be utilized.

7. The method of claim 6, wherein the steps of determining whether an optimized or a generic handler should be used comprise the steps of:

determining whether a message of the identified message type has already been processed;

determining whether an optimized handler exists for the identified message type;

determining whether to generate an optimized handler for the identified message type;

selecting a generic handler if the identified message type has not been processed or if it is determined not to generate an optimized handler for the identified message type; and selecting an optimized handler if an optimized handler exists for the identified message type or if it is determined that an optimized handler should be generated.

8. The method of claim 1, further comprising the step of determining whether there is sufficient storage space to generate a new optimized handler.

9. The method of claim 8, further comprising the step of deleting an optimized handler if there is not sufficient storage space to generate a new optimized handler.

10. The method of claim 1, further comprising the steps of:

monitoring the usage of the messages by the application receiving the messages; and selectively processing portions of the messages based on the monitored usage by the application.

11. The method of claim 10, wherein the step of selectively processing the messages comprises the steps of:

prioritizing portions of the messages for processing based on the usage by the application; and processing the prioritized portions of the messages.

12. The method of claim 11, further comprising the steps of:

delaying the processing of the portions of the messages that are not prioritized; and processing the delayed portions of the message if the application subsequently requires the delayed portions of the message.

13. The method of claim 1, wherein the messages are processed by parsing the message into a format compatible with an application receiving the processed messages.

14. A system for optimizing message processing, the system comprising:

a recording module for collecting and recording processing characteristic information for various message types and generating from the recorded processing characteristic information, actual or estimated processing statistics regarding the performance and other characteristics of each such various message type;

a comparison module that compares the actual or estimated processing statistics for similar messages handled with a generic handler to actual or estimated processing statistics for same type messages handled with an optimized handler;

a message receipt module for receiving a message;

a message type identification module for identifying the message type of the received message;

a handler selection module for determining, based on information from the comparison module, whether an optimized handler should be used to process messages of the identified message type;

an optimized handler generator module for generating an optimized handler for the identified message type if it is determined that an optimized handler should be used and an optimized handler had not previously been generated for the identified message type; and a first processor module for processing messages of the identified message type with the optimized handler associated therewith if it has been determined that an optimized handler should be utilized.

15. The system of claim 14, wherein the handler selection module is configured to determine that a generic handler should process received messages of the identified message type if an optimized handler is not utilized; and further comprising:

a second processor module for processing received messages of the identified type with a generic handler if it has been determined that a generic handler should be utilized.

16. The system of claim 14, further comprising:

a recording module for recording statistics for each identified message type;

a comparison module for comparing statistics for same type messages handled with a generic handler to statistics for same type messages handled with an optimized handler; and wherein the handler selection module determines whether to utilize a generic handler or an optimized handler based on the comparison of processing statistics for the identified message type.

17. The system of any of claim 14, further comprising:

a monitoring module for monitoring the usage of received messages by the application receiving the messages; and a processing selection module for selectively processing portions of the messages based on the monitored usage by the application.

18. A computer program product on a non-transitory computer readable medium adapted to be loaded into a memory and executed by a processor for optimizing message processing, the computer program product comprising:

computer readable program code for collecting and recording processing characteristic information for various message types and generating from the recorded processing characteristic information, actual or estimated processing statistics regarding the performance and other characteristics of each such various message type;

computer readable program code that compares the actual or estimated processing statistics for similar messages handled with a generic handler to actual or estimated processing statistics for same type messages handled with an optimized handler;

computer readable program code portions for receiving a message;

computer readable program code portions for identifying the message type of the received message;

computer readable program code portions for determining whether an optimized handler should be used to process messages of the identified message type;

computer readable program code portions for generating an optimized handler for the identified message type if it is determined that an optimized handler should be used, and an optimized handler had not previously been generated for the identified message type; and computer readable program code portions for processing messages of the identified type with the optimized handler associated therewith if it has been determined that an optimized handler should be utilized.

19. A memory encoded with one or more programs that perform a method for optimizing message processing, the method comprising the steps of:

collecting processing characteristic information for various message types;

recording processing characteristic information for each such various message type collected;

generating from the recorded processing characteristic information, quantitative data regarding the performance and other characteristics of each such various message type;

receiving a message;

identifying the message type of the received message;

determining whether an optimized handler should be used to process messages of the identified message type based on the quantitative data regarding the performance and other characteristics of each such various message type;

generating an optimized handler for the identified message type if it is determined that an optimized handler should be used, and an optimized handler had not previously been generated for the identified message type; and processing messages of the identified message type with the optimized handler associated therewith if it has been determined that an optimized handler should be utilized.

* * * * *

UNITED STATES PATENT AND TRADEMARK OFFICE
CERTIFICATE OF CORRECTION

PATENT NO. : 7,746,773 B2  
APPLICATION NO. : 10/596525  
DATED : June 29, 2010  
INVENTOR(S) : Gerdes et al.

Page 1 of 1

It is certified that error appears in the above-identified patent and that said Letters Patent is hereby corrected as shown below:

On the Title Page, in Item (56), under "FOREIGN PATENT DOCUMENTS", in Column 2, Line 1, delete "WO   WO 01/46837 A 6/2001".

In Column 6, Line 45, before "could", delete "is".

In Column 14, Line 65, in Claim 17, delete "any of".

Signed and Sealed this

Nineteenth Day of October, 2010

David J. Kappos
*Director of the United States Patent and Trademark Office*